(12) United States Patent
Belkar et al.

(10) Patent No.: US 12,542,829 B2
(45) Date of Patent: Feb. 3, 2026

(54) DEVICE AND METHOD FOR REMOTE DIRECT MEMORY ACCESS

(71) Applicant: Huawei Technologies Co., Ltd., Shenzhen (CN)

(72) Inventors: Ben-Shahar Belkar, Hod Hasharon (IL); Sagiv Goren, Hod Hasharon (IL); Reuven Cohen, Hod Hasharon (IL); David Ganor, Hod Hasharon (IL); Amit Geron, Hod Hasharon (IL)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 18/543,594

(22) Filed: Dec. 18, 2023

(65) Prior Publication Data
US 2024/0121302 A1 Apr. 11, 2024

Related U.S. Application Data

(63) Continuation of application No. PCT/EP2021/066530, filed on Jun. 18, 2021.

(51) Int. Cl.
*H04L 67/1097* (2022.01)
(52) U.S. Cl.
CPC .................. *H04L 67/1097* (2013.01)
(58) Field of Classification Search
None
See application file for complete search history.

(56) References Cited

U.S. PATENT DOCUMENTS

| | | | | |
|---|---|---|---|---|
| 10,296,380 | B1* | 5/2019 | Garcia | G06F 9/4887 |
| 10,394,597 | B1* | 8/2019 | Kowalski | G06F 9/5072 |
| 2018/0024861 | A1* | 1/2018 | Balle | G08C 17/02 |
| 2022/0253335 | A1* | 8/2022 | Bequet | G06F 9/5077 |

OTHER PUBLICATIONS

Feldmann et al., "Skueue: A Scalable and Sequentially Consistent Distributed Queue", May 1, 2018, IEEE, 2018 IEEE International Parallel and Distributed Processing Symposium (IPDPS) (2018, pp. 1040-1049) (Year: 2018).*
IEEE Std 1588™-2008, IEEE Standard for a Precision Clock Synchronization Protocol for Networked Measurement and Control Systems, Jul. 24, 2008, 289 pages.
Myung Kyun Kim et al., "Periodic Message Scheduling on a Switched Ethernet for Hard Real-Time Communication," HPCC 2006, 10 pages.

* cited by examiner

*Primary Examiner* — Davoud A Zand
(74) *Attorney, Agent, or Firm* — Conley Rose, P.C.

(57) ABSTRACT

An entity for RDMA is configured to maintain a time-based queue pair (QP). The time-based QP comprises a first area associated with a time-based indication and is configured to hold one or more first WQEs. The time-based indication indicates that the one or more WQEs in the first area are to be periodically processed. The entity is further configured to periodically process the one or more first WQEs in the first area according to the time-based indication.

20 Claims, 13 Drawing Sheets

DEVICE AND METHOD FOR REMOTE DIRECT MEMORY ACCESS

CROSS-REFERENCE TO RELATED APPLICATIONS

This application is a continuation of International Patent Application No. PCT/EP2021/066530 filed on Jun. 18, 2021, the disclosure of which is hereby incorporated by reference in its entirety.

TECHNICAL FIELD

The present disclosure relates to high-performance computing technologies including remote direct memory access (RDMA) technologies. In particular, the present disclosure relates to transporting RDMA transactions over a packet-based network. To this end, the present disclosure provides a device, a method, and a data packet format for RDMA.

BACKGROUND

RDMA is a technology widely used in modern data centers and computer clusters for low-latency and high-bandwidth networking. RDMA offloads memory operations from the central processing unit (CPU) to the RDMA network interface card (NIC) (RNIC), which can directly access the memory. This offloading saves time for the CPU, and thus allows the CPU to perform other tasks.

The software-layer of RDMA uses "verbs" to perform RDMA operations, which are then transformed to work requests written to the RNIC's queues. Such a work request is called a work queue element (WQE), and RDMA operations are either tagged (one-side WRITE/READ/ATOMIC) or untagged (two-sided SEND/RECV). RDMA peers are communications over queue pairs (QPs) offering various transport services. The common QP types (published by InfiniBand (IB) specification) include Reliable Connection (RC) QP, Reliable Datagram (RD) QP, Extended Reliable Connection (XRC) QP, Unreliable Datagram (UD) QP, Unreliable Connection (UC) QP, and Dynamic Connection (DC) QP, etc.

Many applications or tasks require periodic messages with fixed-content, such as Heartbeats/Keep-Alive messages, messages for reporting machine load status, or storage usage status, messages for distributing configuration changes, or reporting round trip time (RTT) measurements (when there is no active traffic). Today, RDMA technologies do not support, for any QP type, a way that WQEs can be reused automatically. That is, the software is required to re-post a WQE after the previous one was processed. Therefore, applications and high-level protocols are using a software-based solution for reporting periodic messages in the current RDMA applications. However, such solution is more complex, less efficient, less accurate, and consumes CPU time.

SUMMARY

In view of the above, embodiments of the present disclosure aim to provide a device and a method for RDMA. An objective is to create a new RDMA QP behavior that is timed-based scheduled, and in particular, enables preconfigured WQEs to be sent on each re-scheduling event. One aim is to allow reusing WQEs over and over without software intervention.

These and other objectives are achieved by the embodiments of the present disclosure as described in the enclosed independent claims. Advantageous implementations of the embodiments of the present disclosure are further defined in the dependent claims.

A first aspect of the present disclosure provides an entity for RDMA. The entity is configured to maintain a time-based QP, wherein the time-based QP comprises a first area associated with a time-based indication, wherein the first area is configured to hold one or more first WQEs, and the time-based indication indicates that the one or more WQEs in the first area are to be periodically processed; and periodically process the one or more first WQEs in the first area according to the time-based indication.

Embodiments of the present disclosure provide a solution for the entity of the first aspect to periodically schedule WQEs with no software involvement. This solution allows the entity to reuse the WQEs in the time-based QP over and over, and there is no need to involve an upper-layer application/software for re-posting a WQE. Notably, WQE and QP are terms from the RDMA specification. A WQE is an RDMA operation or transaction that is pushed into a QP, either to be transmitted to the peer or having been received from the peer. The QP represents a communication endpoint, which consists of a SEND Queue (SQ) and a Receive Queue (RQ), or alternatively a shared RQ. The time-based QP as defined in embodiments of the present disclosure may also be referred to as Periodic-Auto-Scheduled (PAS) QP.

In an implementation form, the time-based indication comprises at least one of the following indications: a periodic interval T for processing the one or more WQEs in the first area; a number N of cycles for processing the one or more WQEs in the first area, N being a positive integer; a time duration within which the one or more WQEs in the first area are to be periodically processed; and to continuously post the one or more WQEs in the first area until a stop instruction is received.

In particular, the number of times this time-based QP needs to be re-scheduled can be limited or infinite (e.g., till QP tears down, or is instructed to stop).

In a further implementation form, a type of the time-based QP comprises one of the following: RC QP, RD QP, XRC QP, UD QP, UC QP, and DC QP.

It should be noted that above mentioned QP types are merely examples. The new approach as described in the present disclosure applies to other existing QP types as well.

In a further implementation form, the one or more first WQEs comprise at least one of an SQ WQE, an RQ WQE, and an SRQ WQE.

In a further implementation form, the one or more first WQEs are associated with at least one of a first destination address and a second destination address, wherein the entity is configured to periodically process the one or more first WQEs to at least one of a first destination entity corresponding to the first destination address and a second destination entity corresponding to the second destination address.

The periodic QP can be used for a single destination or multiple destinations.

In a further implementation form, the entity is further configured to maintain a completion queue (CQ), wherein the first area is further associated with a completion indication, wherein the completion indication indicates a generation manner of completion.

Conventionally, RDMA QPs are always generating a completion on some opcodes (RQ processing, etc.). There is no control to manipulate a conditional completion. According to embodiments of the present disclosure, completions may be configurable.

In a further implementation form, the completion indication comprises at least one of the following indications: to generate a completion after a predefined number of processed first WQEs; to generate a completion after a predefined number of cycles; to generate a completion when an error or a predefined type of error occurs; to generate a completion in response to a notification; and not to generate a completion.

In a further implementation form, the entity is further configured to stop processing the one or more first WQEs in the first area, when an error occurs.

In a further implementation form, the time-based QP comprises a second area, wherein the second area comprises one or more second WQEs, wherein the one or more second WQEs are processed following a doorbell ring.

Possibly, the time-based QP may also have an area for regular WQEs. That is, some of the WQEs in the QP may be periodic ones and the rest may be regular. Only the regular ones are processed following a doorbell ring.

In a further implementation form, the entity is further configured to: add one or more third WQEs into the first area; and periodically process the one or more third WQEs in a following cycle.

Optionally, SQ and RQ of the time-based QP are dynamic. It means that when posting WQE(s), there is no need to suspend the QP's scheduling, enlarge the SQ/RQ, and then resume it. According to the present disclosure, in the next cycle the QP will be scheduled using the new WQE(s) that were additional posted.

In a further implementation form, the entity is further configured to obtain the time-based QP from at least one of a first application and a second application.

Optionally, a single PAS QP can be shared by multiple applications (multiplexing).

In a further implementation form, the entity is further configured to maintain a memory area storing specific data for the entity; monitor the memory area and determine whether the specific data has changed; provide a content of the specific data to one or more other entities for RDMA, using one or more WQEs of the time-based QP, when it is determined that the specific data has changed.

The approach proposed in the present disclosure may be used to distributing changes in memory, such as configuration changes.

A second aspect of the present disclosure provides a method for RDMA. The method comprises maintaining a time-based QP, wherein the time-based QP comprises a first area associated with a time-based indication, wherein the first area is configured to hold one or more first WQEs, and the time-based indication indicates that the one or more WQEs in the first area are to be periodically processed; and periodically processing the one or more first WQEs in the first area according to the time-based indication.

In a further implementation form, the time-based indication comprises at least one of the following indications: a periodic interval T for processing the one or more WQEs in the first area; a number N of cycles for processing the one or more WQEs in the first area, N being a positive integer; a time duration within which the one or more WQEs in the first area are to be periodically processed; and to continuously post the one or more WQEs in the first area until a stop instruction is received.

In a further implementation form, a type of the time-based QP comprises one of the following: Reliable Connection QP, Reliable Datagram QP, Extended Reliable Connection QP, Unreliable Datagram QP, Unreliable Connection QP, and Dynamic Connection QP.

In a further implementation form, the one or more first WQEs comprise at least one of a send queue WQE, a receive queue WQE, and a shared receive queue WQE.

In a further implementation form, the one or more first WQEs are associated with at least one of a first destination address and a second destination address, wherein the entity is configured to periodically process the one or more first WQEs to at least one of a first destination entity corresponding to the first destination address and a second destination entity corresponding to the second destination address.

In a further implementation form, the method further comprises maintaining a completion queue, wherein the first area is further associated with a completion indication, wherein the completion indication indicates a generation manner of a completion.

In a further implementation form, the completion indication comprises at least one of the following indications: to generate a completion after a predefined number of processed first WQEs; to generate a completion after a predefined number of cycles; to generate a completion when an error or a predefined type of error occurs; to generate a completion in response to a notification; and not to generate a completion.

In a further implementation form, the method further comprises stopping processing the one or more first WQEs in the first area, when an error occurs.

In a further implementation form, the time-based QP comprises a second area, wherein the second area comprises one or more second WQEs, wherein the one or more second WQEs are processed following a doorbell ring.

In a further implementation form, the method further comprises adding one or more third WQEs into the first area; and periodically processing the one or more third WQEs in a following cycle.

In a further implementation form, the method further comprises obtaining the time-based QP from at least one of a first application and a second application.

In a further implementation form, the method further comprises maintaining a memory area storing specific data for the entity; monitoring the memory area and determine whether the specific data has changed; providing a content of the specific data to one or more other entities for RDMA, using one or more WQEs of the time-based QP, when it is determined that the specific data has changed.

The method of the second aspect and its implementation forms provide the same advantages and effects as described above for the entity of the first aspect and its respective implementation forms.

A third aspect of the present disclosure provides a computer program comprising a program code for carrying out, when implemented on a processor, the method according to the second aspect or any of its implementation forms.

A fourth aspect of the present disclosure provides a computer readable storage medium comprising computer program code instructions, being executable by a computer, for performing a method according to the second aspect or any of its implementation forms when the computer program code instructions run on a computer.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms will be explained in the following description of specific embodiments in relation to the enclosed drawings, in which.

DESCRIPTION OF EMBODIMENTS

Illustrative embodiments of method, device, and program product for timed-based periodic QP scheduling in a communication system are described with reference to the figures. Although this description provides a detailed example of possible implementations, it should be noted that the details are intended to be exemplary and in no way limit the scope of the application.

Moreover, an embodiment/example may refer to other embodiments/examples. For example, any description including but not limited to terminology, element, process, explanation and/or technical advantage mentioned in one embodiment/example is applicative to the other embodiments/examples.

Figure 1:
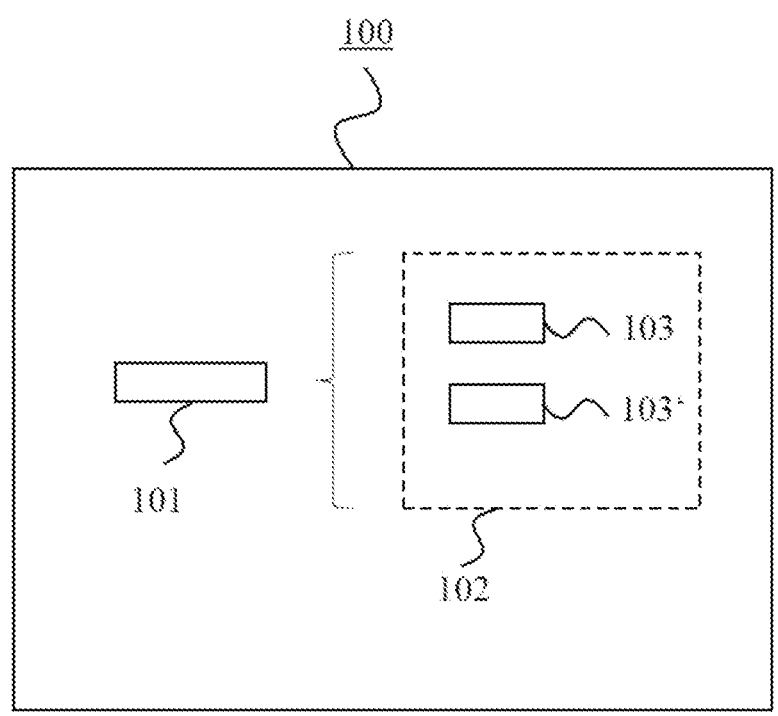
FIG. 1 illustrates an entity according to an embodiment of the present disclosure.

FIG. 1 illustrates an entity 100 adapted for RDMA according to an embodiment of the present disclosure. The entity 100 may comprise processing circuitry (not shown) configured to perform, conduct or initiate the various operations of the entity 100 described herein. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. The entity 100 may further comprise memory circuitry, which stores one or more instruction(s) that can be executed by the processor or by the processing circuitry, in particular under control of the software. For instance, the memory circuitry may comprise a non-transitory storage medium storing executable software code which, when executed by the processor or the processing circuitry, causes the various operations of the entity 100 to be performed. In one embodiment, the processing circuitry comprises one or more processors and a non-transitory memory connected to the one or more processors. The non-transitory memory may carry executable program code which, when executed by the one or more processors, causes the entity 100 to perform, conduct or initiate the operations or methods described herein.

In particular, the entity 100 is configured to maintain a time-based QP 101, wherein the time-based QP 101 comprises a first area 102 associated with a time-based indication. In particular, the first area 102 is configured to hold one or more first WQEs 103, 103', and the time-based indication indicates that the one or more WQEs in the first area 102 are to be periodically processed. The entity 100 is further configured to periodically process the one or more first WQEs 103, 103' in the first area 102 according to the time-based indication.

Embodiments of the present disclosure introduce a new approach where any RDMA QP type can be periodically scheduled WQEs, either SQ or RQ WQEs. The WQEs in the time-based QP will be reused, over and over, and there is no need to manipulate any parameters such as producer index (PI) or consumer index (CI) to re-post the WQEs.

For instance, the type of the time-based QP 101 may be one of the following: RC QP, RD QP, XRC QP, UD QP, UC QP, and DC QP. It should be noted that above listed QP types are merely examples. The new approach as described in the present disclosure applies to any other QP types as well. That is, according to embodiments of the present disclosure, packets based on this new QP behavior, which are sent over the network, can be identical to any of the existing QP types (RC/UD/RD/XRC/UC/DC, etc.), while no change on the network packets is required.

The rescheduling of the same WQEs can be either limited for a certain number of iterations or infinite. According to an embodiment of the present disclosure, the time-based indication comprises at least one of the following indications: a periodic interval T for processing the one or more WQEs in the first area 102; a number N of cycles for processing the one or more WQEs in the first area 102, N being a positive integer; a time duration within which the one or more WQEs in the first area 102 are to be periodically processed; and to continuously post the one or more WQEs in the first area 102 until a stop instruction is received.

According to an embodiment of the present disclosure, the one or more first WQEs 103, 103' comprise at least one of an SQ WQE, an RQ WQE, and a shared RQ (SRQ) WQE. The new QP behavior can use either an RQ or an SRQ. A WQE on the RQ/SRQ is often called an RQ Element (RQE). Multiple RQEs can be posted to the RQ that will be used over and over.

According to an embodiment of the present disclosure, the one or more first WQEs 103, 103' may be associated with at least one of a first destination address and a second destination address, wherein the entity 100 is configured to periodically process the one or more first WQEs 103, 103' to at least one of a first destination entity 100 corresponding to the first destination address and a second destination entity 100 corresponding to the second destination address.

Optionally, the one or more first WQEs 103, 103' may be processed more than once in each re-scheduling event, e.g. when multiple destinations are specified for this message or this QP (when the one or more first WQEs 103, 103' are associated with both the first destination address and the second destination address).

According to an embodiment of the present disclosure, the entity 100 as shown in FIG. 1 may be further configured to maintain a CQ, wherein the first area 102 is further associated with a completion indication, wherein the completion indication indicates a generation manner of a completion.

Optionally, the completion indication may comprise at least one of the following indications: to generate a completion after a predefined number of processed first WQEs 103, 103'; to generate a completion after a predefined number of cycles; to generate a completion when an error or a predefined type of error occurs; to generate a completion in response to a notification; and not to generate a completion.

Conventionally, RDMA QPs are always generating a completion on some opcodes (RQ processing, etc.). There is no control to manipulate a conditional completion. According to the present disclosure, the completions can be generated upon configuration, e.g., per WQE, per a number of re-scheduling events, when reaching RQ's PI pointer, only on error, etc.

Optionally, regular completion events are discarded, if they are mandatory for the specific QP type. The generation of the completions may be continuously scheduled, or not scheduled at all, or re-scheduled when an error occurs and let the application handle the reported error, e.g., delete the WQE, tear down the QP, etc.

According to an embodiment of the present disclosure, the entity 100 may be configured to stop processing the one or more first WQEs 103, 103' in the first area 102, when an error occurs.

Optionally, the time-based QP 101 may further comprise a second area, wherein the second area comprises one or more second WQEs, wherein the one or more second WQEs are processed following a doorbell ring. It should be noted that the same QP (PAS QP) may have a special area for periodic WQEs, and have an area for regular WQEs (the regular ones are processed following a doorbell ring as defined in the existing RDMA specification).

According to an embodiment of the present disclosure, the entity 100 may be configured to add one or more third WQEs into the first area 102; and periodically process the one or more third WQEs in the following cycle.

Optionally, the SQ/RQ of the PAS QP are dynamic, meaning that when posting WQEs, there is no need to suspend the QP's scheduling, enlarge the SQ/RQ, and then resume it. Instead, the new periodic WQEs may be added into the first area, then the QP will schedule the new periodic WQEs together with the existing ones in the next (and the following) rescheduling event.

Optionally, a single PAS QP can be shared by multiple applications (multiplexing). According to an embodiment of the present disclosure, the entity 100 may be configured to obtain the time-based QP 101 from at least one of a first application and a second application.

Figure 2:
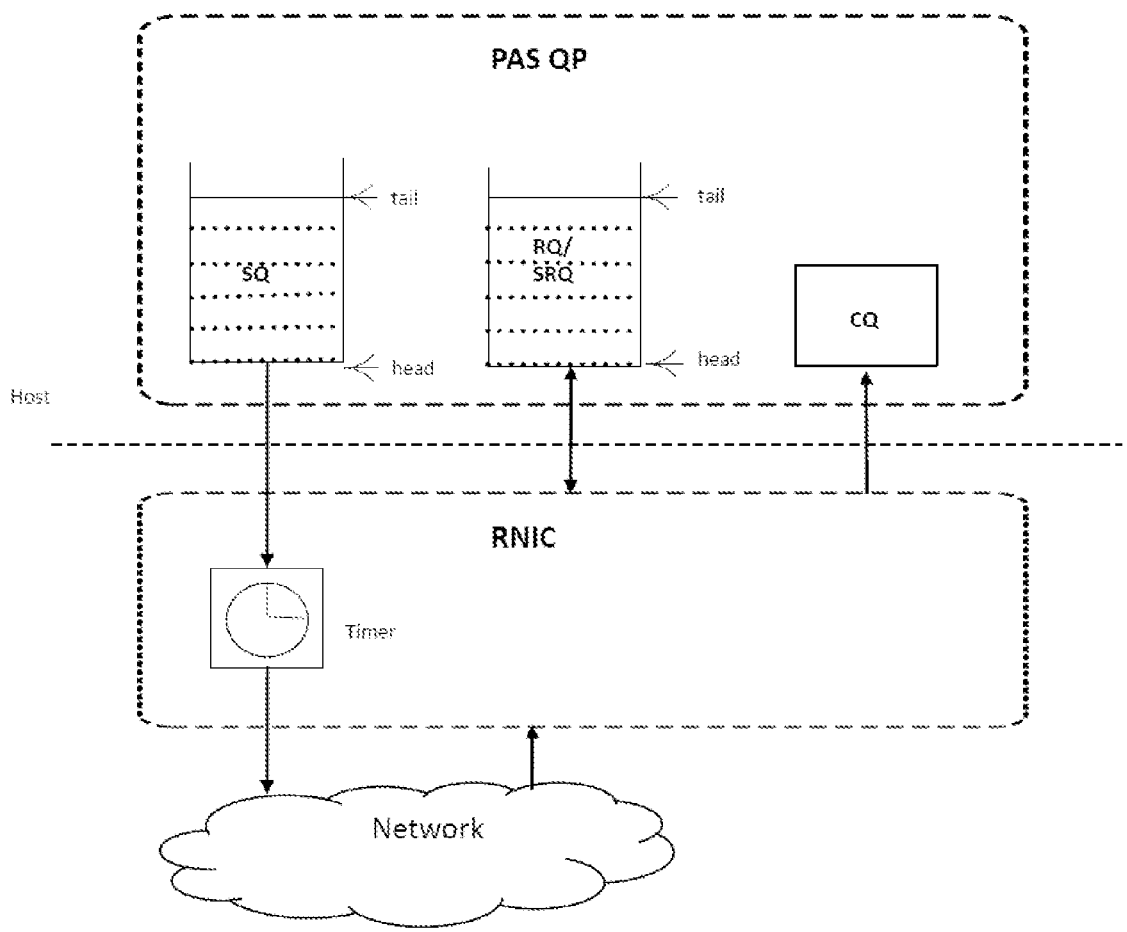
FIG. 2 illustrates a schematic diagram according to an embodiment of the present disclosure.

FIG. 2 illustrates a schematic diagram of an RNIC according to an embodiment of the present disclosure. The PAS QP comprises a SQ, a RQ/SRQ, and a CQ. Any single WQE comprised in this QP could include multiple destinations in each (re)scheduling event.

The "tail" of a queue (SQ or RQ/SRQ) may be indicated using the parameter PI, and the "head" of the queue may be indicated using the parameter CI. Notably, when PI≠CI, it implies that there are one or more WQEs in the queue that are supposed to be processed; when PI=CI, it means the work has been finished. The "tail" is updated only when posting additional WQEs. The "head" is updated only when deleting a previously posted WQE, or when adding new WQEs.

The timer in the RNIC may set the periodic interval T for processing one or more WQEs in the PAS QP. Each time the timer expires, RNIC processes all WQEs between the "head" and the "tail" of the SQ. According to embodiments of the present disclosure, packets to the network are formatted according to existing QP types.

Notably, RDMA operations comprise Read, Write, Send, Receive, Atomic, etc. The RQ/SRQ is required only if Write-with-Immediate or Send operation is required. The CQ is required when completions are generated or errors occurred.

RNIC may be a Requester RNIC or a Responder RNIC. In particular, the Requester RNIC processes all WQEs that are posted to the SQ, on every re-scheduling event. Responder RNIC uses the next WQE posted to the RQ/SRQ, every time a Send or Write-with-Immediate request is received. Upon reaching to the RQ's PI pointer it will continue from the RQE pointed by CI pointer, in a cyclic way.

The entity 100 as shown in FIG. 1 may be a Requester RNIC or a Responder RNIC.

As previously mentioned, many applications or tasks require periodic messages with fixed content. The new PAS QP as defined in embodiments of the present disclosure is especially advantaged when applies to these use cases. Specific embodiments based on different use cases will be described in detail in the following.

"Heartbeat" is a periodic signal, generated by hardware or software, to indicate normal operation or to synchronize other parts of a computer system. Heartbeat messages are normally exchanged between endpoints (a sender node and a receiver node) at a regular interval in the order of seconds or milliseconds. If the receiver node does not receive a heartbeat for a time (usually a few heartbeat intervals), then the sender node is assumed to have failed.

Heartbeat messages may also be used for high-availability and fault-tolerance purposes.

Heartbeat messages are typically sent in a continuous, recurring, periodic manner from the time an endpoint (the sender node) is started until it is shut down, when a destination endpoint (the receiver node) identifies lost heartbeat messages, during an anticipated arrival period, then it may determine that the initiator endpoint (the sender node) has failed, shutdown, or is generally no longer available.

Figure 3:
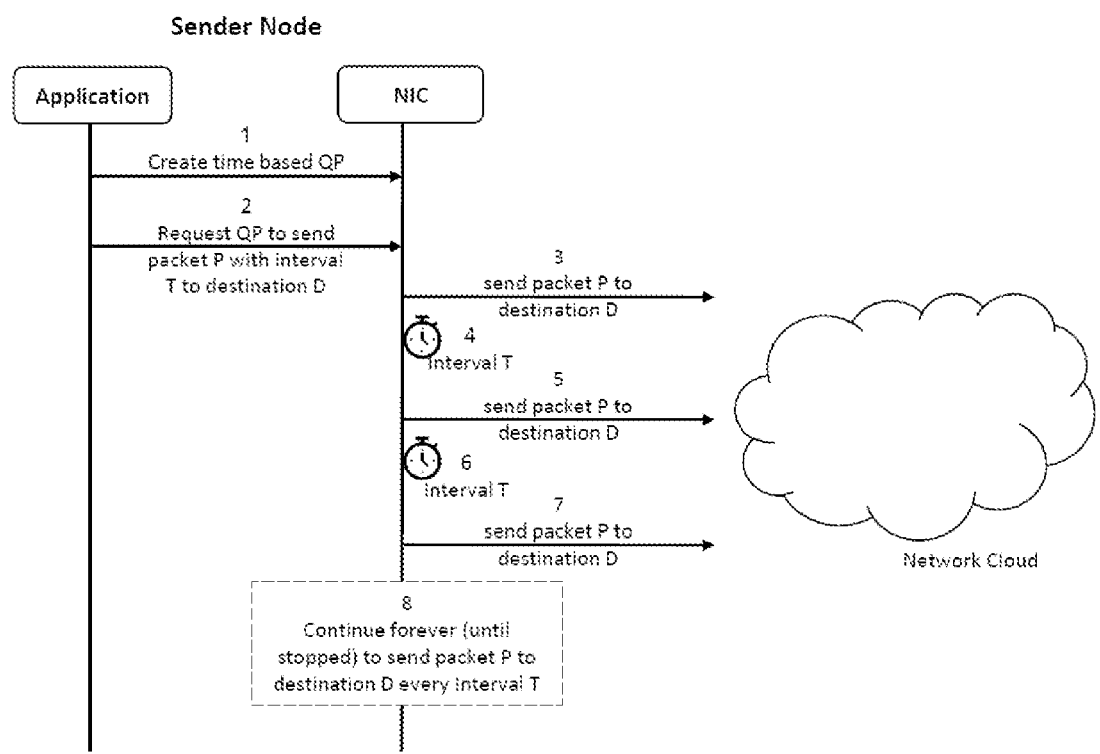
FIG. 3 illustrates a signaling flowchart at a sender node according to an embodiment of the present disclosure.

FIG. 3 illustrates a signaling flowchart at a sender node according to an embodiment of the present disclosure. The sender node here may be an endpoint that needs to send a "Heartbeat" message. Notably, the sender node may also be any other devices that need to send a periodic signal.

In this embodiment, the application creates a time-based QP, and requests the QP to send a packet P with an interval T to a destination D. The packet P here may be a heartbeat signal. Accordingly, the NIC starts sending the packet P to the destination D periodically based on the timer. That is, the NIC starts the timer and sends the packet P to the destination D after the interval T expires in every cycle. This continues forever until stopped (e.g., the sender fails).

Figure 4:
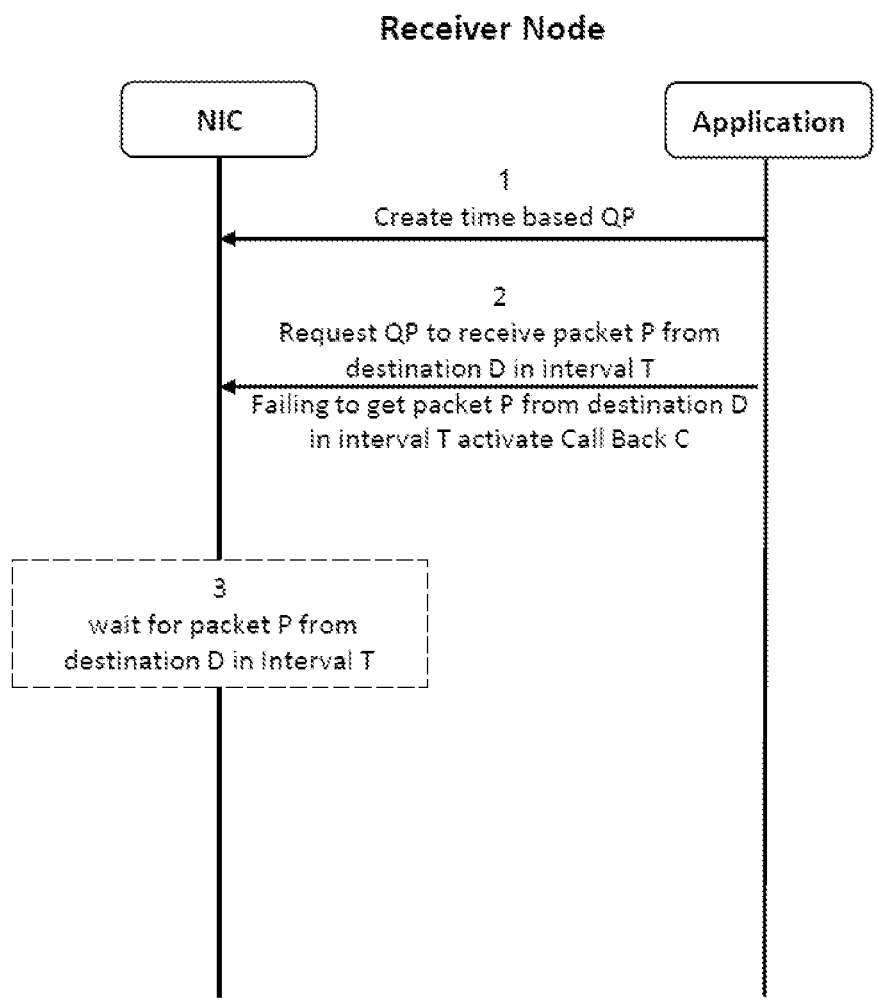
FIG. 4 illustrates a signaling flowchart at a receiver node according to an embodiment of the present disclosure.

FIG. 4 illustrates a signaling flowchart at a receiver node according to an embodiment of the present disclosure. The receiver node here may be a destination endpoint that receives a "Heartbeat" message. Notably, the receiver node may also be any other devices that need to receive a periodic signal.

In this embodiment, the application creates a time-based QP, and requests the QP to receive a packet P with an interval T from a destination D. The packet P here may be a heartbeat signal. Optionally, failing to get the packet P from destination D in interval T may activate a Call Back C. Accordingly, the NIC waits for the packets P from the destination D, unless a request from the application to remove the QP or to remove the destination D is received. Optionally, if a packet P from the destination D did not arrive in interval T, the NIC may active a Call Back C. According to QP configuration, the MC will decide whether to continue to wait for the packets P or wait for the application to request NIC QP to wait again for the packets P from destination D in interval T.

Figure 5:
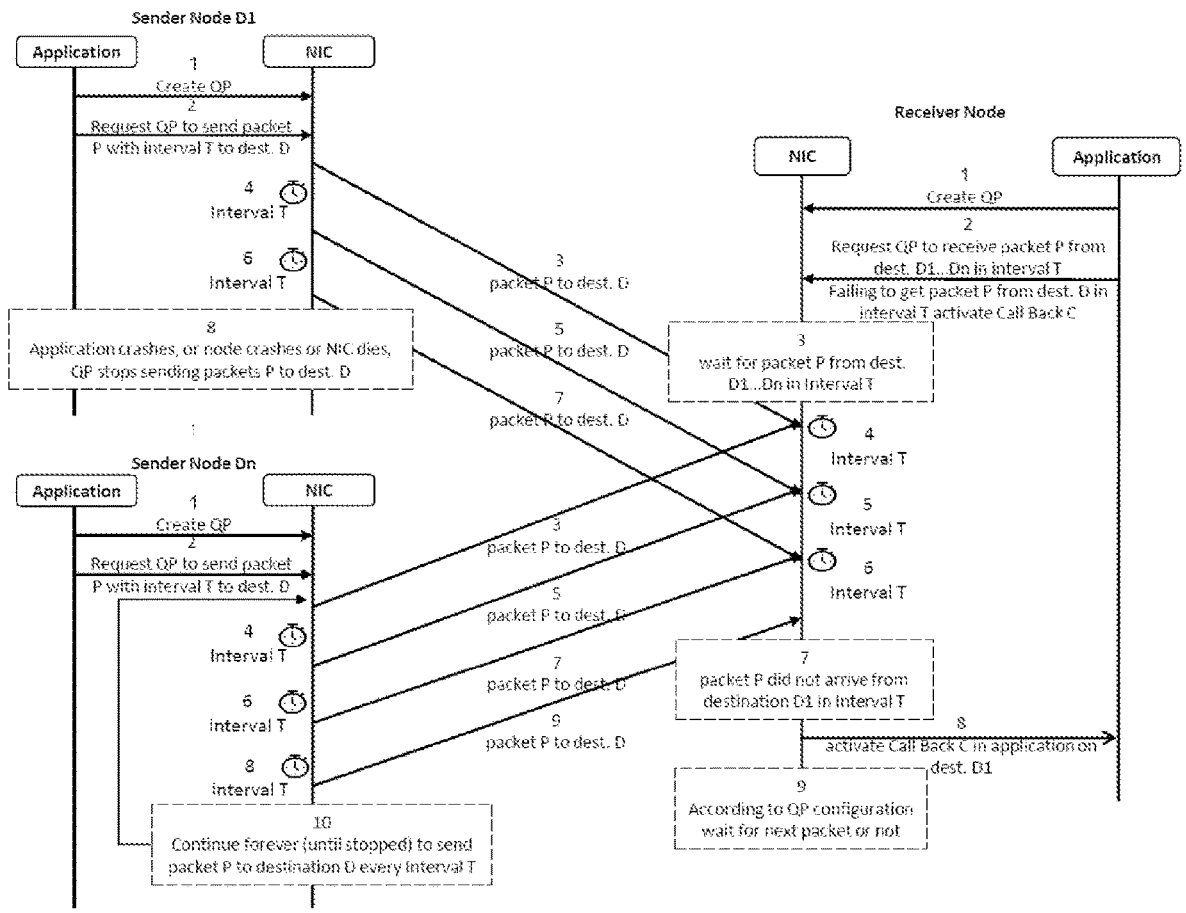
FIG. 5 illustrates packets exchange between multiple senders and a receiver according to an embodiment of the present disclosure.

FIG. 5 illustrates packets exchange between multiple sender nodes and a receiver node according to an embodiment of the present disclosure. The sender node D1 and the sender node Dn may be the sender node shown in FIG. 3. The receiver node may be the receiver node shown in FIG. 4.

Each of the sender node D1, . . . , Dn periodically sends a packet P to the destination D, i.e., the receiver node. The QP of the receiver node is requested to receive packet P from destinations (the sender nodes) D1, . . . , Dn in interval T. Notably, in step 7 at the receiver node, a packet P did not arrive from the sender node D1 in interval T. Accordingly, the NIC at the receiver node activates Call Back C in application on the sender node D1. According to QP configuration, the NIC will decide whether to continue waiting for the next packets P from the sender node D1.

Figure 6:
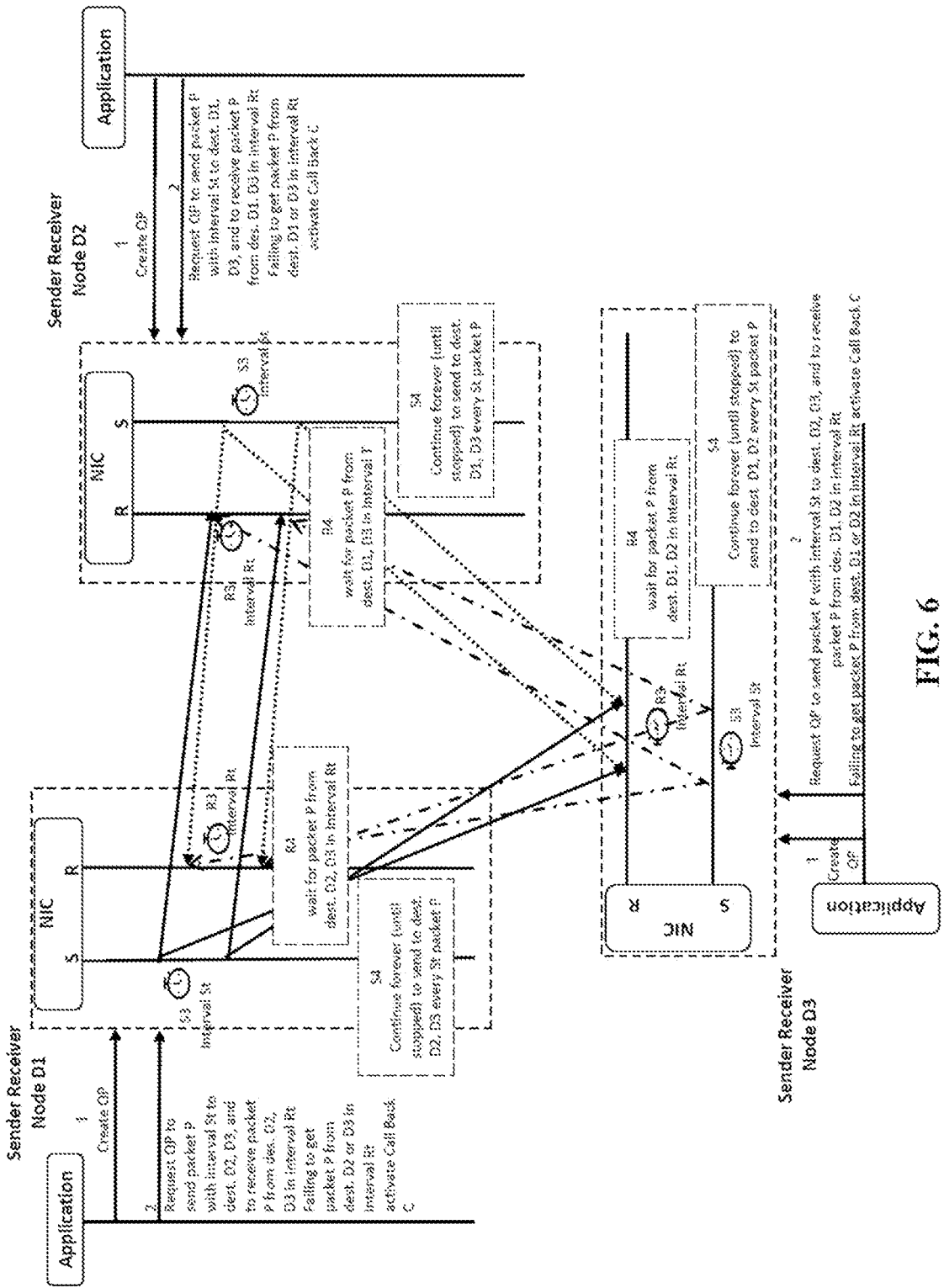
FIG. 6 illustrates packets exchange among multiple destinations according to an embodiment of the present disclosure.

FIG. 6 illustrates packets exchange among multiple destinations according to an embodiment of the present disclosure. Each destination may be a sender nodes, a receiver node, or a sender receiver node. In the example shown in FIG. 6, each of Node D1, D2 and D3 are a sender receiver node.

For a particular NIC, a timer for a send interval St for sending packets P, and/or a timer for a receive interval Rt for receiving packets P, may be configured. Taking Node D1 as an example, the periodic QP of Node D1 is requested to send packet P with interval St to Nodes D2 and D3, and it is also requested to receive packet P with interval Rt from Nodes D2 and D3. Failing to get packet P from Node D2 or D3 in interval T activates Call Back C. Notably, Node D2 and D3 may be configured in a similar manner.

Load balancing refers to a process of distributing a set of tasks over a set of resources (computing units), with the aim of making their overall processing more efficient. Load balancing techniques can optimize the response time for each task, avoiding unevenly overloading computing units, while other computing units are idle.

Two main approaches exist for load balancing. One is referred to as static algorithms, which do not take into account the state of the different computing units. The other one is referred to as dynamic algorithms, which are more general and more efficient, but require an exchange of information between the different computing units, at the risk of lower efficiency.

Numerous scheduling algorithms, also called load-balancing methods, are used by load balancers to determine which computing unit to send a task to. Simple algorithms include random choice, round-robin, least number of connections, etc. More sophisticated load balancers may take additional factors into account, such as a computing unit's reported load, least response times, operational/shutdown status (determined by a monitoring poll of some kind), number of active connections, geographic location, capabilities, amount of network traffic sent or received, etc.

Figure 7:
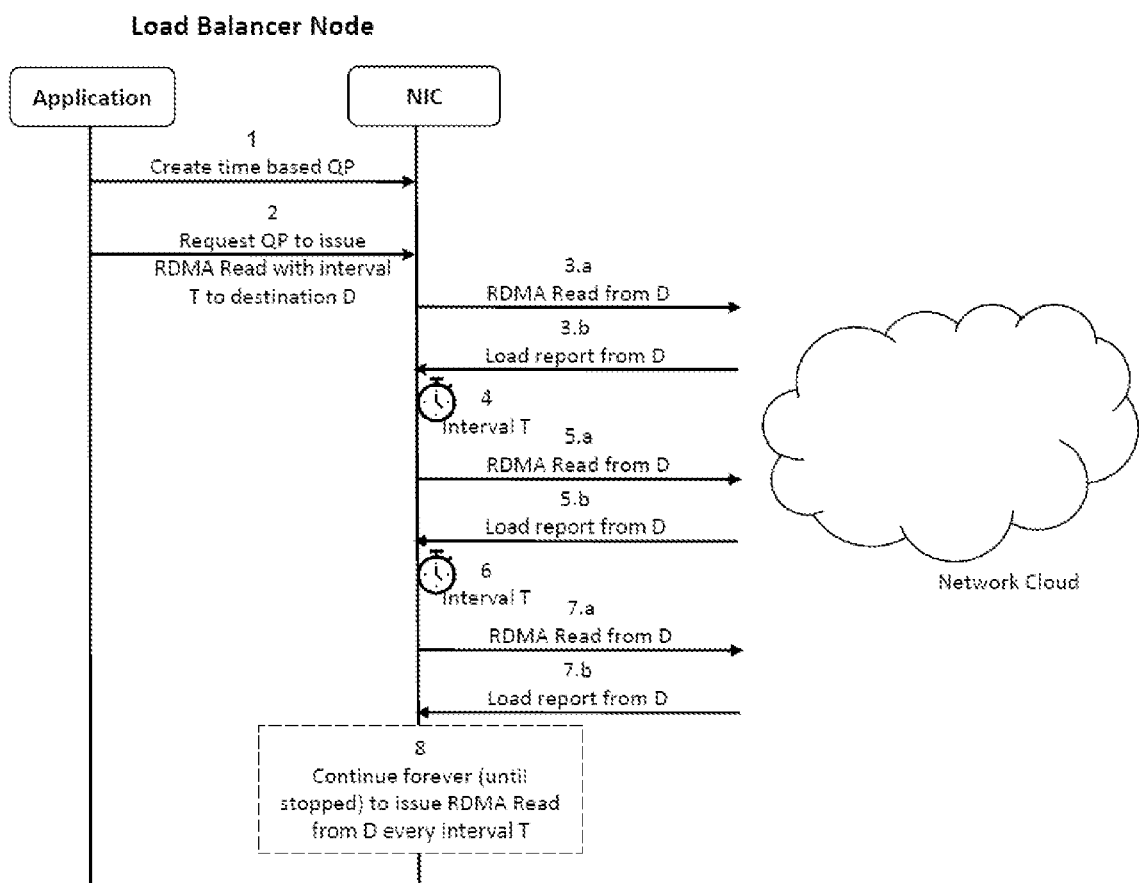
FIG. 7 illustrates a signaling flowchart at a Load Balancer node according to an embodiment of the present disclosure.

FIG. 7 illustrates a signaling flowchart at a Load Balancer node according to an embodiment of the present disclosure. In this embodiment, the application creates a time-based QP, and requests the QP to issue RDMA Read operation and load report with an interval T from a destination D. Accordingly, the NIC starts periodically issuing RDMA Read and loading report from the destination D based on the timer of the interval T. That is, the NIC starts the timer, issues RDMA Read, and load report from the destination D after the interval T expires in every cycle. This continues forever until the application stops, or terminates the QP, or changes the timer (the interval T), or when the application is killed.

Figure 8:
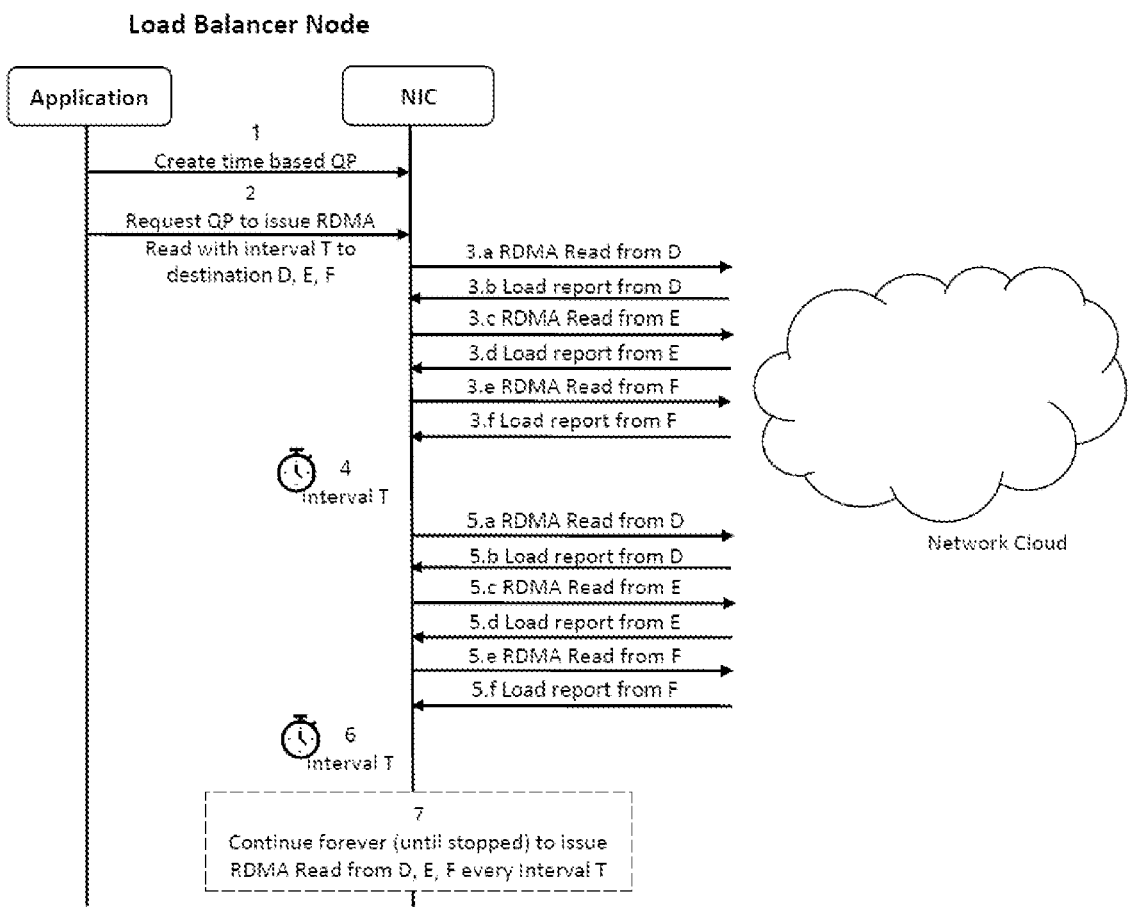
FIG. 8 illustrates a signaling flowchart at a Load Balancer node according to an embodiment of the present disclosure.

FIG. 8 illustrates a signaling flowchart at a Load Balancer node according to an embodiment of the present disclosure. In this embodiment, the application creates a time-based QP, and requests the QP to issue RDMA Read operation and load report with an interval T from multiple destinations, i.e., D, E and F. Accordingly, the NIC starts periodically issuing RDMA Read and loading report from each of the destinations D, E and F based on the timer of the interval T. That is, the NIC starts the timer, issues RDMA Read, and load report from each of the destinations D, E and F after the interval T expires in every cycle. Similar to the embodiment shown in FIG. 7, this process continues forever until the application stops, or terminates the QP, or changes the timer (the interval T), or when the application is killed.

Figure 9:
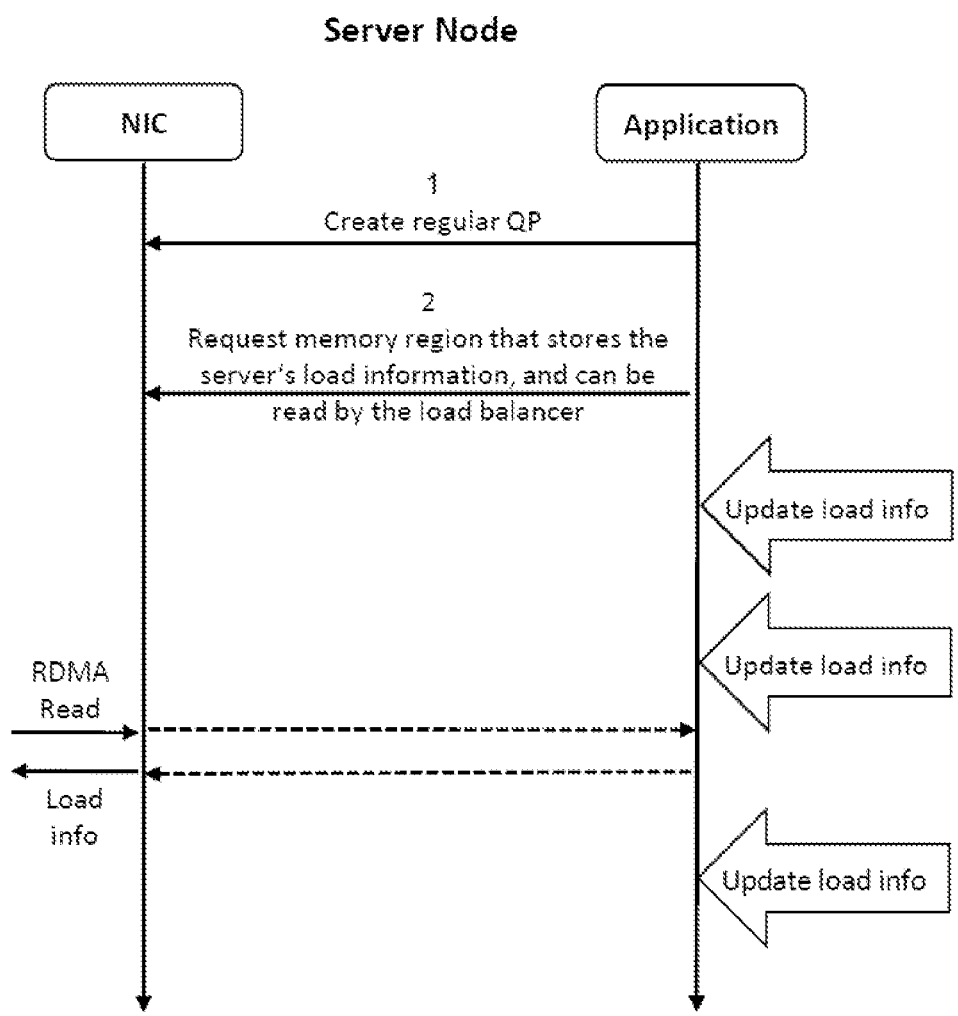
FIG. 9 illustrates a signaling flowchart at a Server node according to an embodiment of the present disclosure.

FIG. 9 illustrates a signaling flowchart at a server node according to an embodiment of the present disclosure. In this embodiment, the application creates a regular QP, and requests a memory region, which stores the server's load information and can be read by the Load Balancer. The application updates load information locally from time to time. Incoming RDMA Read requests from the Load Balancer node will read and return the server's load information directly from the application's memory.

Figure 10:
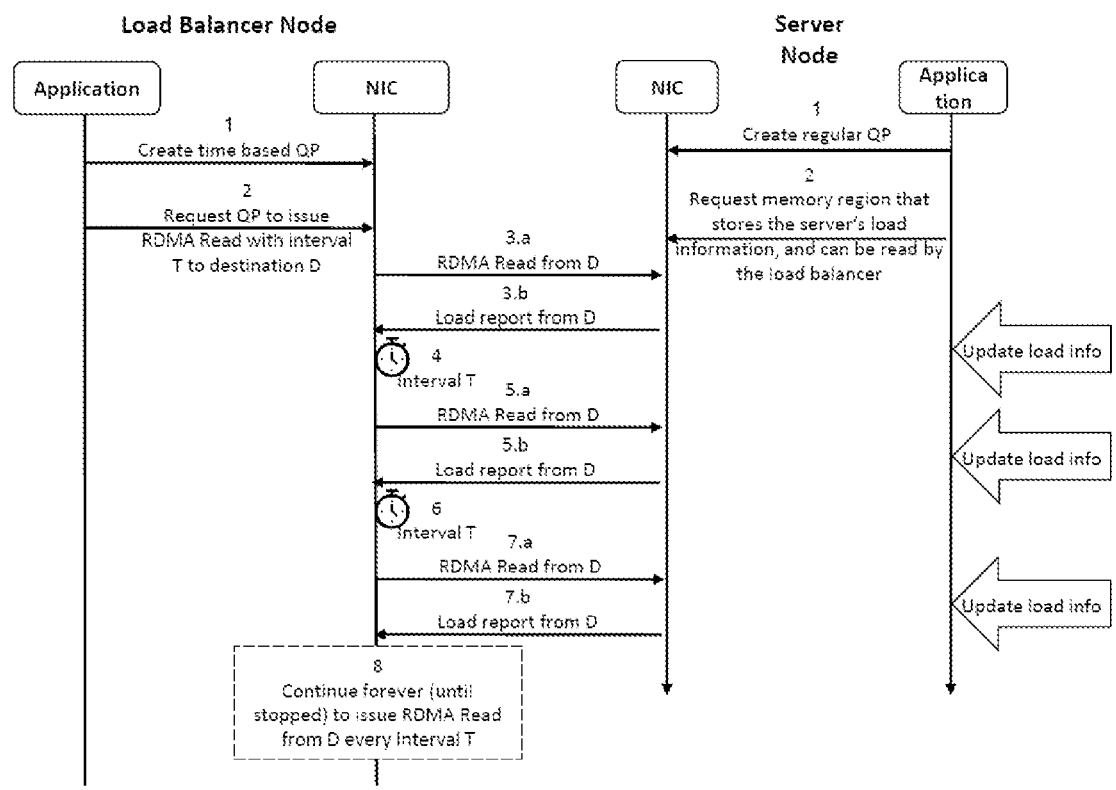
FIG. 10 illustrates packets exchange between a Load Balancer node and a Server node according to an embodiment of the present disclosure.

FIG. 10 illustrates packets exchange between a Load Balancer node and a server node according to an embodiment of the present disclosure. The Load Balancer node shown in FIG. 10 may be the Load Balancer node shown in FIG. 7. The server node shown in FIG. 10 may be the server node shown in FIG. 9.

Figure 11:
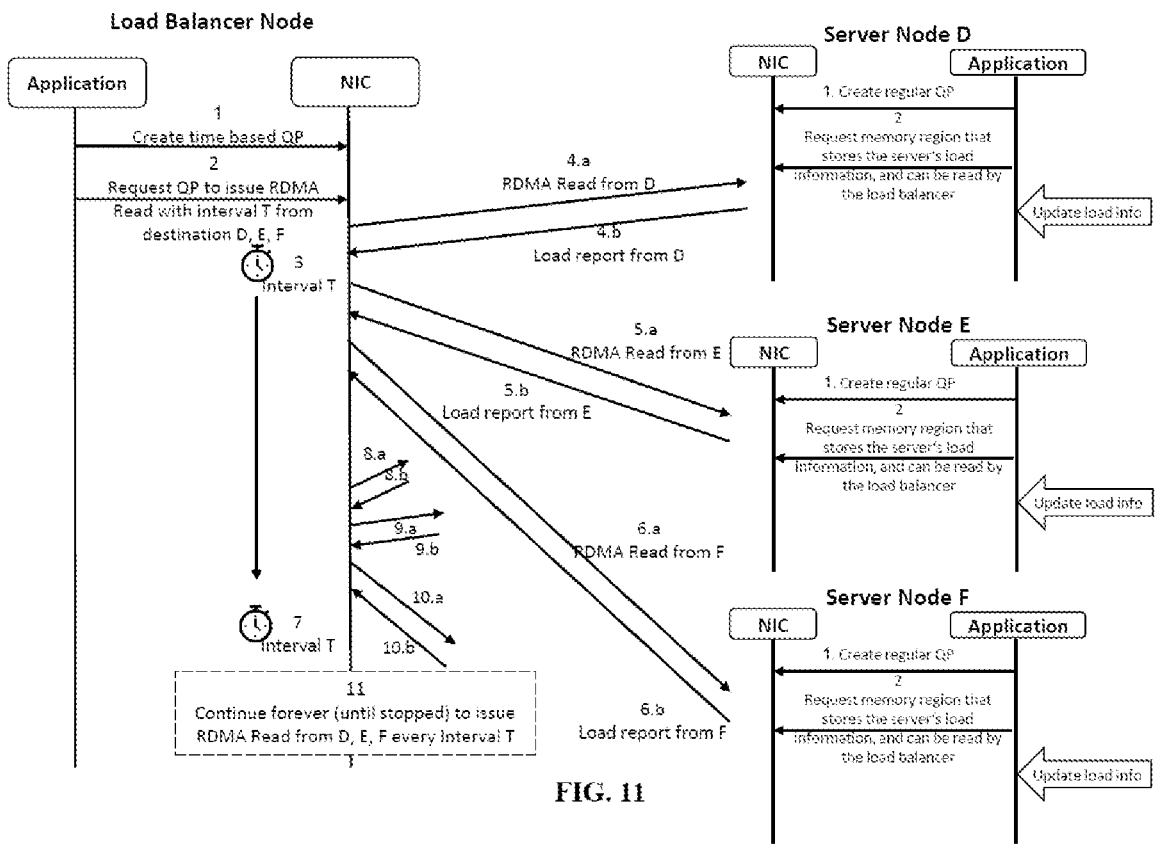
FIG. 11 illustrates packets exchange between a Load Balancer node and multiple Server nodes according to an embodiment of the present disclosure.

FIG. 11 illustrates packets exchange between a Load Balancer node and multiple server nodes according to an embodiment of the present disclosure. The Load Balancer node shown in FIG. 10 may be the Load Balancer node shown in FIG. 7. Each of the server nodes D, E and F shown in FIG. 10 may be the server node shown in FIG. 9.

The application at the Load Balancer node creates a time-based QP, and requests the QP to issue RDMA Read operation and load report with an interval T from each of the server node D, E and F. Accordingly, the NIC starts periodically issuing RDMA Read and loading report from the destination D based on the timer of the interval T. That is, the NIC starts the timer, issues RDMA Read, and load report from each of the server node D, E and F after the interval T expires in every cycle. This continues forever until the application stops, or terminates the QP, or changes the timer (the interval T), or when the application is killed.

As configuration changes need to be delivered to all nodes of a cluster, distributing configuration changes is applied to clusters of many nodes. A configuration change may include nodes' failures, new nodes joining the cluster, or global parameters change, etc.

Configuration changes are usually managed by a cluster controller, when a node in a cluster receives a configuration change, it acts according to the requested specific change.

The process of distributing configuration changes requires a vast amount of CPU time. In the cluster controller, it needs a complex software to code and deploy, and involves a reliable network protocol. Offloading this process to another entity, such as a smart network interface card (SmartNIC), removes a huge burden from the application developer.

According to an embodiment of the present disclosure, the entity 100 may be further configured to maintain a memory area storing specific data for the entity 100. The entity 100 may monitor the memory area and determine whether the specific data has changed. When it is determined that the specific data has changed, the entity 100 may be configured to provide a content of the specific data to one or more other entities for RDMA, using one or more WQEs of the time-based QP 101.

Figure 12:
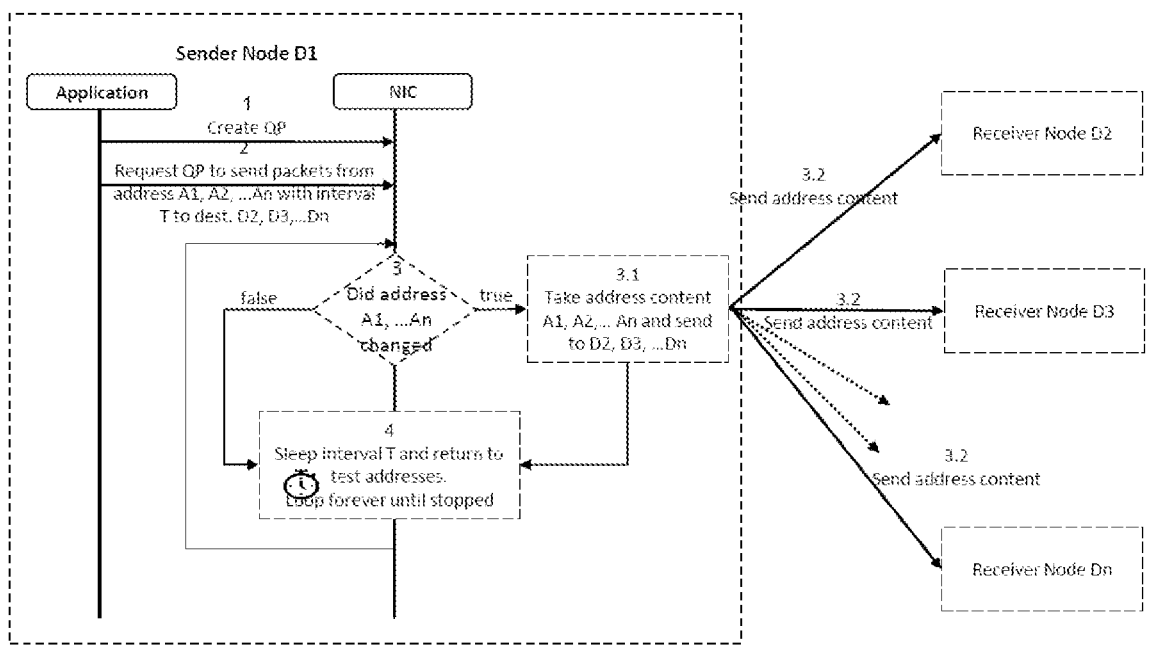
FIG. 12 illustrates a signaling flowchart for distributing changes according to an embodiment of the present disclosure.

FIG. 12 illustrates a signaling flowchart of a sender node distributing changes according to an embodiment of the present disclosure. In this embodiment, the application of the sender node D1 creates a time-based QP, and requests the QP to send packets with an interval T to each of the receiver nodes D2, D2, . . . , Dn. The NIC continuously checks whether contents in certain memory (e.g., addresses A1 to An) have been changed. The content may include configurations or parameters for the receiving nodes. If the contents or a part of the contents have been changed, the NIC takes the whole content in the memory and sends it to each of the receiver node D2, D3, . . . , Dn. This procedure is repeated until it has been instructed to stop.

It should be noted that any data modification compared to a previous cycle will trigger a transmission (i.e., the distribution of changes). If the data remains the same, it will go to sleep till the next period. The new approach of the present disclosure can be applied to distributing configuration data, either one sender to one receiver, or one sender to multiple receivers.

To summarize, embodiments of the present disclosure propose a new RDMA QP behavior which is timed-based scheduled. In particular, preconfigured WQEs in the QP are to be sent on each re-scheduling event. The WQEs in the QP will be reused without re-posting them. Notably, the number of times this QP needs to be re-scheduled can be either limited or infinite (i.e. till QP tears down). Any existing types of QP can be used for implementing this new QP behavior, while no changes on the network packets are needed. The periodic QP can be used for a single destination or multiple destinations, and multiplex different applications messages on the same QP. The messages can be unicast or multicast, and it depends on the QP type capabilities (Only UD QP can multicast).

It may be worth mentioning that the common existing programming model for periodic messages is to perform this kind of logic in the upper-layer application by the main CPU, which makes it more complex, less efficient, less accurate and also consumes CPU time. Based on embodiments of the present disclosure, even a non RDMA application can use this QP behavior to offload periodic messages to the hardware without software intervention.

Figure 13:
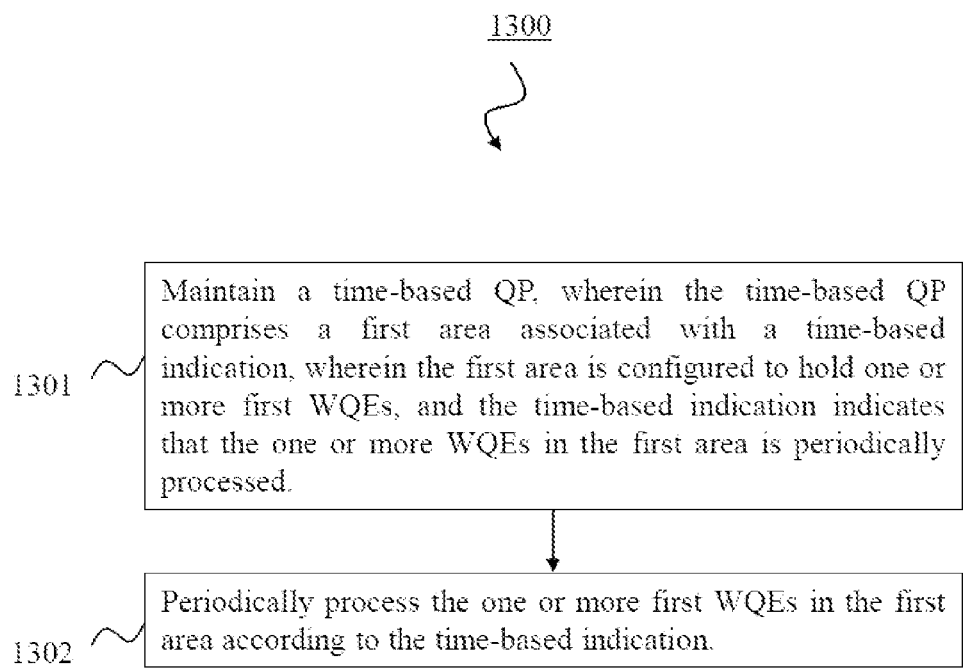
FIG. 13 illustrates a method according to an embodiment of the present disclosure.

FIG. 13 illustrates a method 1300 for RDMA according to an embodiment of the present disclosure. In a particular embodiment of the present disclosure, the method 1300 is performed by an entity 100 shown in FIG. 1. The method 1300 comprises a step 1301 of maintaining a time-based QP 101. In particular, the time-based QP 101 comprises a first area 102 associated with a time-based indication. The first area 102 is configured to hold one or more first WQEs 103, 103', and the time-based indication indicates that the one or more WQEs in the first area 102 are to be periodically processed. The method 1300 further comprises a step 1302 of periodically processing the one or more first WQEs 103, 103' in the first area 102 according to the time-based indication.

Optionally, the time-based indication may comprise at least one of the following indications: a periodic interval T for processing the one or more WQEs in the first area 102; a number N of cycles for processing the one or more WQEs in the first area 102, N being a positive integer; a time duration within which the one or more WQEs in the first area 102 are to be periodically processed; and to continuously post the one or more WQEs in the first area 102 until a stop instruction is received.

Optionally, the one or more first WQEs 103, 103' are associated with at least one of a first destination address and a second destination address, wherein the method further comprises periodically processing the one or more first WQEs 103, 103' to at least one of a first destination entity 100 corresponding to the first destination address and a second destination entity 100 corresponding to the second destination address.

Optionally, the method 1300 further comprises maintaining a CQ, wherein the first area 102 is further associated with a completion indication, wherein the completion indication indicates a generation manner of a completion.

Optionally, the completion indication may comprise at least one of the following indications: to generate a completion after a predefined number of processed first WQEs 103, 103'; to generate a completion after a predefined number of cycles; to generate a completion when an error or a predefined type of error occurs; to generate a completion in response to a notification; and not to generate a completion.

Optionally, the method 1300 further comprises stopping processing the one or more first WQEs 103, 103' in the first area 102, when an error occurs.

Optionally, the method 1300 further comprises adding one or more third WQEs into the first area 102; and periodically processing the one or more third WQEs in the following cycle.

Optionally, the method 1300 further comprises obtaining the time-based QP 101 from at least one of a first application and a second application.

Optionally, the method 1300 further comprises maintaining a memory area storing specific data for the entity 100; monitoring the memory area and determine whether the specific data has changed; providing a content of the specific data to one or more other entities for RDMA, using one or more WQEs of the time-based QP 101, when it is determined that the specific data has changed.

The present disclosure has been described in conjunction with various embodiments as examples as well as implementations. However, other variations can be understood and effected by those persons skilled in the art and practicing the claimed disclosure, from the studies of the drawings, the present disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Furthermore, any method according to embodiments of the present disclosure may be implemented in a computer program, having code means, which when run by processing means causes the processing means to execute the steps of the method. The computer program is included in a computer readable medium of a computer program product. The computer readable medium may comprise essentially any memory, such as a read-only memory (ROM), a programmable ROM (PROM), an erasable PROM (EPROM), a flash memory, an electrically erasable PROM (EEPROM), or a hard disk drive.

Moreover, it is realized by the skilled person that embodiments of the entity 100 comprises the necessary communication capabilities in the form of e.g., functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, digital signal processors (DSPs), trellis-coded modulation (TCM) encoder, TCM decoder, power supply units, power feeders, communication interfaces, communication protocols, etc. which are suitably arranged together for performing the solution.

Especially, the processor(s) of the entity 100 may comprise, e.g., one or more instances of a CPU, a processing unit, a processing circuit, a processor, an ASIC, a microprocessor, or other processing logic that may interpret and execute instructions. The expression "processor" may thus represent a processing circuitry comprising a plurality of processing circuits, such as, e.g., any, some or all the ones mentioned above. The processing circuitry may further perform data processing functions for inputting, outputting, and processing of data comprising data buffering and device control functions, such as call processing control, user interface control, or the like.

What is claimed is:

1. An entity comprising:
a memory configured to store instructions; and
one or more processors coupled to the memory and configured to execute the instructions to cause the entity to:
maintain a time-based queue pair (QP) comprising a first area associated with a time-based indication, wherein the first area is configured to hold one or more first working queue elements (WQEs), and wherein the time-based indication indicates that the one or more WQEs in the first area are to be periodically processed; and
periodically process the one or more first WQEs in the first area according to the time-based indication.

2. The entity according to claim 1, wherein the time-based indication comprises at least one of the following:
a periodic interval T for processing the one or more WQEs in the first area;
a number N of cycles for processing the one or more WQEs in the first area, wherein N is a positive integer;
a time duration within which the one or more WQEs in the first area are to be periodically processed; or
an instruction to continuously post the one or more WQEs in the first area until a stop instruction is received.

3. The entity according to claim 1, wherein the one or more first WQEs are associated with at least one of a first destination address or a second destination address, wherein the entity is further configured to periodically process the one or more first WQEs to at least one of a first destination entity or a second destination entity, wherein the first destination entity corresponds to the first destination address, and wherein the second destination entity corresponds to the second destination address.

4. The entity according to claim 1, wherein the one or more processors are further configured to execute the instructions to cause the entity to maintain a completion queue, wherein the first area is further associated with a completion indication indicating a generation manner of a completion.

5. The entity according to claim 4, wherein the completion indication is at least one of the following:
to generate a completion after a predefined number of processed first WQEs;
to generate a completion after a predefined number of cycles;
to generate a completion when an error or a predefined type of error occurs;
to generate a completion in response to a notification; or
not to generate a completion.

6. The entity according to claim 1, wherein the one or more processors are further configured to execute the instructions to cause the entity to stop, when an error occurs, processing of the one or more first WQEs in the first area.

7. The entity according to claim 1, wherein the time-based QP further comprises a second area comprising one or more second WQEs, and wherein the one or more processors are further configured to execute the instructions to cause the entity to process the one or more second WQEs following a doorbell ring.

8. The entity according to claim 1, wherein the one or more processors are further configured to execute the instructions to cause the entity to:
add one or more third WQEs into the first area; and
periodically process the one or more third WQEs in a following cycle.

9. The entity according to claim 1, wherein the one or more processors are further configured to execute the instructions to cause the entity to obtain the time-based QP from at least one of a first application or a second application.

10. The entity according to claim 1, wherein the one or more processors are further configured to execute the instructions to cause the entity to:
maintain a memory area storing specific data for the entity;
determine that the specific data has changed in the memory area; and
provide, in response to the specific data changing in the memory area, content of the specific data to one or more other entities for remote direct memory access (RDMA) using one or more WQEs of the time-based QP.

11. A method, implemented by an entity, the method comprising:
maintaining a time-based queue pair (QP) comprising a first area associated with a time-based indication, wherein the first area is configured to hold one or more first working queue elements (WQEs), and wherein the time-based indication indicates that the one or more WQEs in the first area is periodically processed; and periodically processing the one or more first WQEs in the first area according to the time-based indication.

12. The method according to claim 11, wherein the time-based indication comprises at least one of the following:
- a periodic interval T for processing the one or more WQEs in the first area;
- a number N of cycles for processing the one or more WQEs in the first area, N is a positive integer;
- a time duration within which the one or more WQEs in the first area are to be periodically processed; or
- an instruction continuously process the one or more WQEs in the first area until a stop instruction is received.

13. The method according to claim 12, wherein the one or more first WQEs are associated with at least one of a first destination address or a second destination address, wherein the method further comprises periodically processing the one or more first WQEs to at least one of a first destination entity or a second destination entity, wherein the first destination entity corresponds to the first destination address, and wherein the second destination entity corresponds to the second destination address.

14. The method according to claim 11, further comprising maintaining a completion queue, wherein the first area is further associated with a completion indication indicating a generation manner of a completion.

15. The method according to claim 14, wherein the completion indication is at least one of the following:
- to generate a completion after a predefined number of processed first WQEs;
- to generate a completion after a predefined number of cycles;
- to generate a completion when an error or a predefined type of error occurs;
- to generate a completion in response to a notification; or
- not to generate a completion.

16. The method according to claim 11, further comprising stopping, when an error occurs, processing of the one or more first WQEs in the first area.

17. The method according to claim 11, further comprising:
- adding one or more third WQEs into the first area; and
- periodically processing the one or more third WQEs in a following cycle.

18. The method according to claim 11, further comprising obtaining the time-based QP from at least one of a first application or a second application.

19. The method according to claim 11, further comprising:
- maintaining a memory area storing specific data for the entity;
- determining that the specific data has changed in the memory area; and
- providing, in response to the specific data changing in the memory area, a content of the specific data to one or more other entities for remote direct memory access (RDMA) using one or more WQEs of the time-based QP.

20. A computer program product comprising a program code stored on a non-transitory computer-readable storage medium, the program code when executed by one or more processors of an entity, cause the entity to:
- maintain a time-based queue pair (QP) comprising a first area associated with a time-based indication, wherein the first area is configured to hold one or more first working queue elements (WQEs), and wherein the time-based indication indicates that the one or more WQEs in the first area is periodically processed; and
- periodically process the one or more first WQEs in the first area according to the time-based indication.

* * * * *